United States Patent [19]

Louis et al.

[11] 4,248,941

[45] Feb. 3, 1981

[54] SOLID ELECTROLYTE ELECTROCHEMICAL CELL

[75] Inventors: George A. Louis, West Hartford; John M. Lee, Bloomfield; Donald L. Maricle; John C. Trocciola, both of Glastonbury, all of Conn.

[73] Assignee: United Technologies Corp., Hartford, Conn.

[21] Appl. No.: 107,191

[22] Filed: Dec. 26, 1979

[51] Int. Cl.³ .............................................. H01M 8/10
[52] U.S. Cl. ......................................... 429/13; 429/30; 204/195 S
[58] Field of Search ..................... 429/30, 31, 32, 33, 429/191, 192, 193, 124, 13, 15; 204/1 S, 195 S

[56] References Cited

U.S. PATENT DOCUMENTS

| | | | |
|---|---|---|---|
| 3,230,115 | 1/1966 | Tamminen | 429/124 |
| 3,525,646 | 8/1970 | Tannenberger et al. | 429/31 |
| 3,719,564 | 3/1973 | Lilly et al. | 204/1 S |
| 3,974,054 | 8/1976 | Poolman et al. | 204/195 S |
| 4,190,499 | 2/1980 | Pebler | 204/1 S |

FOREIGN PATENT DOCUMENTS

2304464  8/1974  Fed. Rep. of Germany ....... 204/195 S

Primary Examiner—Donald L. Walton
Attorney, Agent, or Firm—Stephen E. Revis

[57] ABSTRACT

A new type of electrochemical cell which can be used for generating electricity or in an electrolysis mode for producing gases such as hydrogen and oxygen comprises laterally spaced apart or side-by-side catalyst layers as electrodes with the gap between the catalyst layers being bridged by a solid electrolyte which provides an ion conductive path from one catalyst layer to the other. The catalyst layers and the electrolyte are preferably in the form of thin films or layers on the surface of an inert supporting substrate. A plurality of these cells may be disposed on the substrate and interconnected electrically forming a network of series and parallel connected cells. Means are provided to feed fuel and oxidant to the electrodes either as separate gases or mixed together if appropriate catalytic materials are selected.

21 Claims, 14 Drawing Figures

SOLID ELECTROLYTE ELECTROCHEMICAL CELL

DESCRIPTION

1. TECHNICAL FIELD

The present invention relates to electrochemical cells, and, more particularly to electrochemical cells of simplified construction which utilize a solid electrolyte.

2. BACKGROUND ART

Electrochemical cells such as fuel cells are very old in the art. The basic components of an electrochemical cell are an anode electrode, a cathode electrode and an electrolyte. Using the fuel cell as an example, in the more conventional type fuel cell each electrode is a self-supporting sheet of electrically conducting material which includes a layer of catalytic material on one surface thereof or perhaps a catalytic material is distributed throughout the sheet. The surface of the anode and cathode electrode having the catalyst layer disposed thereon (or either surface if the electrode simply includes catalysts dispersed throughout) are arranged facing each other with the electrolyte disposed therebetween. The electrolyte may simply be a circulating liquid filling the space between the facing surfaces of the electrodes, or the liquid electrolyte may be disposed in a porous, nonelectrically conductive matrix which is sandwiched between the two electrodes. An example of the former type of fuel cell configuration is described in commonly owned U.S. Pat. No. 3,253,953. The latter type of cell is represented by commonly owned U.S. Pat. Nos. 4,017,664 and 4,129,685.

The electrolytes used in these types of cells may be either base electrolytes such as potassium hydroxide or acid electrolytes such as phosphoric acid. Other electrolytes which have been used are molten carbonate electrolytes, which are solid at room temperatures and liquid or molten at cell operating temperatures and materials (such as borophosphoric acid) which are gels at room temperature and at operating temperatures; For the most part, presently known good electrolytes of the types just described are very corrosive at cell operating temperatures, which severely limit the materials which can be used for other cell components.

Electrolytes which are solid at high temperatures have also been proposed and tested. They are described in detail in the book "Solid Electrolytes—General Principles, Characterization, Materials, Applications" edited by P. Hagenmuller and W. Van Gool, Academia Press, N.Y. (1978). One such electrolyte is doped zirconia ceramic. Zirconia is thermally and chemically stable at high temperatures and is not corrosive like many acid and base electrolytes. The book teaches that at temperatures greater than about 700° C. zirconia has excellent oxygen ion conductivity.

This same book also describes, at pages 447 and 448, a "thin-film" fuel cell concept, wherein a cell is constructed by overlaying, onto a porous substrate, a film of cathode catalyst material, followed by a film of doped zirconia electrolyte, followed by a film of anode catalyst material. Each film is stated as being 30–100 micrometers thick, forming a conventional sandwich type structure (with electrolyte in the middle) between 90–300 micrometers thick. The cell operates by feeding a gaseous fuel directly to the anode and by feeding the oxidant to the cathode catalyst layer through the porous substrate. As with other prior art cells, the electrolyte serves as a gas barrier between the oxidant on one side of the cell and the fuel on the other side. The requirement that the electrolyte be a gas barrier also severely restricts the materials which can be used as the electrolyte.

DISCLOSURE OF THE INVENTION

One object of the present invention is an electrochemical cell stack of simplified construction.

An additional object of the present invention is a fuel cell which is operable on an oxidant and fuel reactant gas mixture.

Another object of the present invention is an improved cell utilizing a solid electrolyte.

Yet another object of the present invention is an electrochemical cell which is operable efficiently at low temperatures.

Another object of the present invention is an electrochemical cell configuration suitable for high speed production methods.

According to one aspect of the present invention an electrochemical cell comprises thin, laterally spaced apart anode and cathode catalyst layers in close proximity to each other with a solid electrolyte bridging the gap between the catalyst layers to provide an ion conductive path from one layer to the other. Another aspect of the present invention is a plurality of these cells laterally disposed relative to each other and connected electrically in series.

As used in the foregoing statement of the invention and in the remainder of the specification and claims, "laterally" means "to the side" such that elements "laterally spaced apart" or "laterally disposed relative to one another" do not have surfaces (other than edge surfaces) facing one another.

One important feature of the present invention is the lateral spacing of the catalyst layers of each cell with the solid electrolyte interconnection between these layers such that ion conduction between the catalyst layers is substantially parallel to the surfaces of the catalyst layers. This is in contrast to all known prior art cells wherein the electrodes have their catalyst surfaces facing each other with the electrolyte disposed therebetween forming a sandwich-like structure; and ion conduction between electrodes is substantially perpendicular to the surfaces of the catalyst layers.

In one exemplary embodiment the cell components are thin layers of appropriate materials. For example, the electrolyte may be a thin layer of solid material disposed on a supporting inert substrate, and the catalyst layers (i.e., electrodes) may be thin layers of catalytic material applied to the surface of the electrolyte layer with a small gap between adjacent edges of the catalyst layers. Appropriate means are provided to feed reactant gases to the catalyst layers. An electrochemical reaction then occurs where each catalyst layer contacts the electrolyte layer; and ions of a suitable species are formed and are conducted via the electrolyte layer across the gap between the catalyst layers while electrons are released and flow from one catalyst layer to the other via a suitable external electrical interconnection.

With the anode and cathode catalyst on the "same side" of the cell, the role of the electrolyte as reactant gas barrier between the fuel and oxidant is eliminated by the present invention. This may permit the use of some materials as electrolyte which otherwise would be unsuitable. Furthermore, this permits (although it does not require) the use of extremely thin and perhaps even monolayer electrolyte films.

In this description of the invention and in the appended claims the phrase "solid electrolyte" is used in its broadest sense to include any electrolyte which exhibits the mechanical properties of a solid as opposed to a liquid. In other words, "solid" means a material which retains its shape without the benefit of a container or a porous supporting matrix. It, therefore, includes materials which are generally considered gels. Also, a material may still be considered a solid electrolyte even if its mechanism of ion conduction is through a liquid medium or is aided by a liquid medium disposed on its surface or within its pores.

For best efficiency cells of small dimensions are preferred with catalyst layers having projected surface areas on the order of a square centimeter or less and most preferably even orders of magnitude smaller. The gaps between anode and cathode catalyst layers of a cell are also, preferably, correspondingly small. The idea is to minimize cell resistance losses by reducing the distance the ions must travel. The low cell resistance resulting from the small cell dimensions expands the number of materials which may be suitable as solid electrolytes. Along these same lines, electrolytes which had sufficient ionic conductivity only at very high temperatures in prior art cell constructions, may have adequate ionic conductivity at much lower temperatures when used in accordance with the teachings of the present invention, thereby further opening up the field of candidate electrolyte materials.

From the foregoing it is apparent that a cell of the present invention is intended to produce only a small current, perhaps measured in microamps. High voltage and power output is obtained by connecting a large number of cells in series to form a group of cells, with the cells laterally disposed relative to each other on a common supporting surface. A large supporting surface, such as a thin wafer, could accommodate many groups of series connected cells; and the groups may be electrically connected in parallel and series to form a cell stack which further multiplies the power output. These wafers may be stacked together and electrically interconnected to form a cell stack capable of producing virtually any desired power output. Photolithographic thin film technology as used in the semiconductor integrated circuit art, is contemplated as being usable in the manufacture of cells, cell-groups and cell stacks according to the present invention.

If the individual cells of a cell stack are large enough, manifolding means could be provided to feed the cathodes with an oxidant such as air and the anodes with a fuel such as hydrogen, keeping the two reactants separate from each other as in conventional cells. If the individual cells in a network of series and parallel connected cells are very small, it may not be physically possible or practical to keep the fuel and oxidant separate over the individual anode and cathode catalyst layers. In that case the fuel and oxidant would be fed as a mixture over the catalyst layers of all the cells. It may be that the reactants would have to be diluted to prevent autoignition in the presence of the catalysts; or, instead, the catalysts may be appropriately selective to the oxidation of hydrogen or to the reduction of oxygen.

It is contemplated that cells of the present invention may be operable on fuels other than hydrogen (e.g., alcohols, hydrocarbons, and the like) and oxidants other than oxygen (e.g., halogens, peroxides, oxides of nitrogen, and the like). Cells of the present invention may also be operated in the regenerative mode to accomplish energy storage.

BEST MODE FOR CARRYING OUT THE INVENTION

Figure 1:
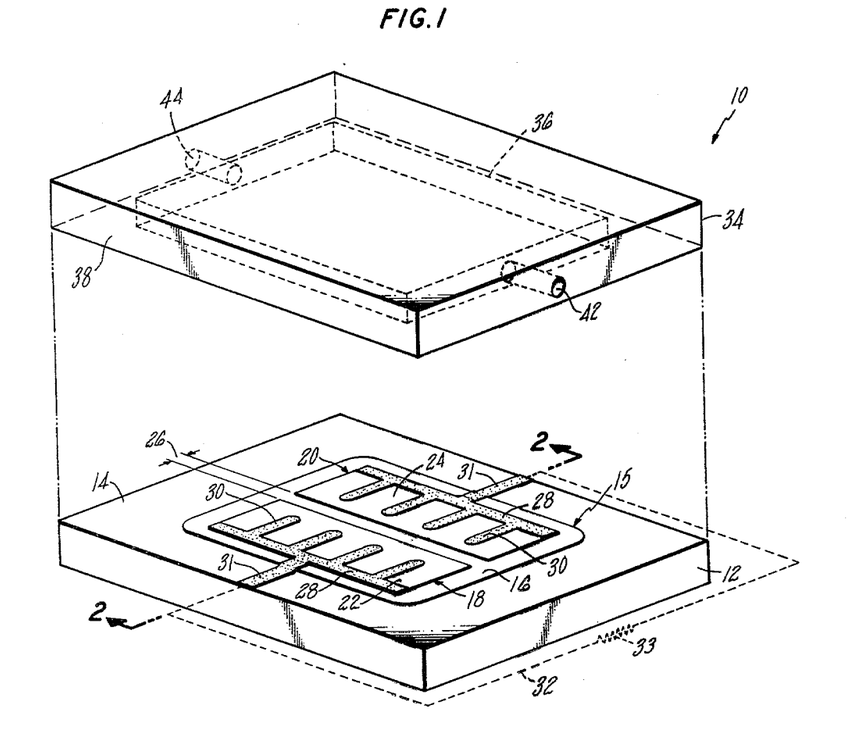
FIG. 1 is an exploded perspective view of a cell assembly in accordance with the present invention.
Figure 2:
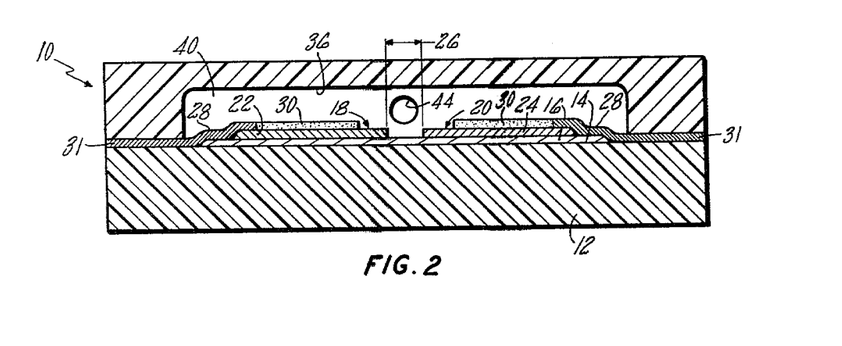
FIG. 2 is a cross-sectional view of the cell assembly of FIG. 1 taken along the line 2—2 of FIG. 1 and showing the cell elements with exaggerated thickness.

FIGS. 1 and 2 show a "mixed reactant" type fuel cell in accordance with an exemplary embodiment of the present invention. In a mixed reactant type cell, the fuel, such as hydrogen, and the oxidant, such as oxygen in the form of air, are mixed together and the mixture is fed to both the anode and cathode of the cell simultaneously via a common reactant gas space over the electrodes.

Referring to FIG. 1, a cell assembly 10 comprises a supporting plate 12 having a flat top surface 14. Disposed on and adhered to the surface 14 is a fuel cell 15 comprising a thin layer of solid electrolyte 16, and anode electrode 18, and a cathode electrode 20. The anode and cathode electrodes are disposed on and adhered to the surface of the electrolyte layer 16. The anode electrode 18 is simply a thin, gas porous, electrically conductive anode catalyst layer 22, and the cathode electrode 20 is simply a thin, gas porous, electrically conductive cathode catalyst layer 24. The anode and cathode catalyst layers are laterally spaced apart in close proximity to each other with a gap 26 being defined between the layers. A thin electrically conductive layer 28 of metal paint is disposed along an edge of each catalyst layer 22, 24. Each electrically conductive layer 28 also includes fingers 30 of electrically conducting material extending over the surface of the catalyst layer and a narrow stripe 31 of electrically conducting material extending from the catalyst layer to the edge of the support plate 12. An external circuit 32 (shown dotted) including a load 33, electrically interconnects the two electrodes. A cover plate 34 mates with the top surface 14 of the support plate 12; and a cutout 36 in the bottom surface 38 of the cover plate defines a reactant gas space 40 (see FIG. 2) over the electrodes 18, 20. The cover plate 34 also includes a reactant gas inlet channel 42 and a reactant gas outlet channel 44, both in communication with the gas space 40.

FIG. 2 is a cross section through the cell assembly 10 of FIG. 1 with the electrolyte layer 16, the catalyst layers 22, 24, and the electrically conductive layers 28 drawn with greatly increased thickness for the purpose of clarity. In actuality these layers are like very thin layers of paint and may only be several micrometers thick, as will be hereinafter further described.

In operation the reactant gas mixture is passed through the cell assembly 10 in contact with the electrodes 18, 20, via the inlet channel 42, the gas space 40, and the outlet channel 44. Assuming that the electrolyte material is a proton conductor (although this need not be the case), at the anode electrode the fuel in the mixture (e.g., hydrogen) passes into the anode catalyst layer 18 and reacts electrochemically in the presence of the catalyst and electrolyte thereby generating electrons, protons, and heat. The electrons are conducted away from the anode electrode by the electrically conductive layer 28, and are conducted to the cathode electrode 20 via the external circuit 32. The ions are conducted to the cathode electrode 20 by the electrolyte layer 16 which provides an ion conductive path between the catalyst layers by bridging the gap 26 therebetween. At the cathode electrode 20 the oxidant in the reactant gas mixture (e.g., oxygen) electrochemically reacts with the ions and electrons from the anode electrode to produce water which leaves the cell as a vapor with the spent reactant gases via the outlet channel 44, the electron flow from one electrode to the other through the external circuit 32, is the useful electrical energy generated by the cell 15.

One advantage of the present invention, and the most obvious physical difference between the prior art and cells of the present invention, is that the anode and cathode electrodes are side by side with the electrolyte bridging the gap between adjacent electrode edges, rather than the electrodes being face to face with the electrolyte filling the volume between opposing surfaces of the electrode and acting as a reactant gas separator or barrier. The electrolyte in the present invention is truly only an ion conductor between the electrodes since its role as a reactant gas separator has been eliminated. This is also the case even if separate fuel and oxidant reactants are provided to the anode electrode and cathode electrode, as shown in other embodiments hereinafter to be described.

Another important feature and advantage of the present invention is the elimination of a "functional" substrate for the catalyst layers. In most cells of the prior art the catalyst layers of at least one and sometimes both electrodes are adhered to one side of a gas porous substrate. A reactant gas is fed to the other side of the substrate and must pass through it to react with the catalyst layer and the electrolyte. In prior art cells using a liquid electrolyte there is the further complication of electrode flooding which requires the catalyst layer and perhaps the substrate to include wetproofing material, such as polytetrafluoroethylene. The result, in any case, is reduced effective surface area of the catalysts and increased difficulty in bringing the reactant gas into contact with both the catalyst and the electrolyte to effect the electrochemical reaction. These problems are eliminated by the present invention which uses a solid electrolyte, no wetproofing, and no porous catalyst supports. While the book "Solid Electrolytes" by Hagenmuller et al referred to above describes, on pages 442 and 443, a solid electrolyte "sandwich" type cell with similar advantages, that cell is limited to a tubular configuration, which is an undesirable restriction and, more importantly, requires a structurally self-supporting electrolyte element which also must serve as a gas barrier.

One of the basic ideas behind the cell of the present invention is to minimize cell resistance and maximize catalyst effectiveness in a manner consistent with the ultimate objective (from a commercial point of view) of manufacturing a cost effective fuel cell stack having a useful power output. Reducing cell resistance is accomplished, in part, by minimizing the gap 26 between the electrodes, thereby reducing the distance the ions must travel to effect the electrochemical reaction. This makes the job of the electrolyte easier and permits the use of some materials as electrolytes which otherwise would not be considered to have sufficient ionic conductivity to be useful in fuel cells. In the alternative, some electrolytes which were only thought to have sufficiently high ion conductivity at high temperatures (e.g., zirconia at 700° C. and above) might now have sufficiently high ionic conductivity to be an effective fuel cell electrolyte at much lower temperatures and perhaps even at room temperature.

The present invention provides a unique opportunity to employ electrolytes which conduct primarily by surface ion conduction as opposed to the normal bulk ionic conduction. This is made possible by relieving the electrolyte of the gas separation requirement thus allowing the surface of a solid to interconnect the two electrodes. Ionic conduction in cells of the present invention is, however, not limited to surface ion conduction. Examples disclosed in this application may, in fact, function partially by bulk and partially by surface ionic conduction. It is not required that the exact type of conduction be known in order to practice this invention.

In the exemplary embodiment of FIGS. 1 & 2, the electrolyte is in the form of a thin layer. In that embodiment (and other embodiments using thin layers of electrolyte) it is preferred that the electrolyte layer be no greater than about 50 micrometers thick and most preferably less than 10 micrometers thick. It is not presently known what the lower limit of thickness is such that satisfactory ion conduction is still obtained. Satisfactory performance has been obtained with layers measured to be about 3 micrometers thick.

Notwithstanding the foregoing, a thick electrolyte layer, even thick enough to be self-supporting, could also be used in the present invention, but would not be expected to provide any improvement in cell performance (as compared to a thin film electrolyte) and is likely to be wasteful of material.

We have tested Baymal ® alumina (a fibrillar boehmite alumina formerly manufactured by E. I. DuPont and more fully described in U.S. Pat. No. 2,915,475) as an electrolyte in fuel cells of the present invention and found it to work satisfactorily. Other materials which might make suitable electrolytes for use in the present invention are: hydronium $\beta''$ alumina, hydrogen uranyl phosphate, phosphomolybdic acid, and phosphotungstic acid. These other materials have been recently reported in the literature as being highly ion conductive in the solid state. Additional possible electrolyte materials are silica gel, alumina gel or the like.

Turning now to the electrodes, if the fuel and oxidant are separately manifolded to the anode and cathode electrodes, respectively, a conventional, electrically conductive fuel cell anode and cathode catalytic material, such as platinum or supported platinum, may be used for both catalyst layers. On the other hand, if mixed reactants are used, such as is the case in the embodiments shown in FIGS. 1 and 2, something must be done to cause an electrical potential to exist between the electrodes. For example, "selective" catalysts may be used for one or both electrodes. In this application a selective catalyst is one which, in the presence of mixed fuel and oxidant, will favor, to a significant extent, either the anode or cathode electrochemical reaction. Furthermore, as herein defined, to prevent ignition of the reactant mixture, a selective catalyst does not contribute to the direct chemical combination of the reactants.

Whether conventional or selective catalysts are utilized, it is preferred (although not required) that the catalyst layer be an intimate mixture of the catalytic material and the electrolyte material. This brings the electrolyte material and the catalyst material into intimate contact thereby improving the catalyst/electrolyte/reactant gas interaction during cell operation. The electrolyte may also serve as a binder for the catalyst layer. Some catalysts which may be used to selectively reduce oxygen are: strontium ruthenate ($SrRuO_3$) and lanthanum manganate ($LaMnO_3$). A catalyst which is selective to the oxidation of hydrogen is lanthanum cobalt ruthenate [$La(CO_{0.5}Ru_{0.5})O_3$].

Alternatively, a catalyst layer can be covered with a film or layer or material which is selective to (i.e., favors) the diffusion therethrough of the particular gas to be reacted at the electrode. A selective diffusion layer of this type does not have to be 100% selective to be effective. In other words, it does not have to completely exclude the other gases in the mixture. For example, some materials known to be selective to the diffusion of hydrogen are: nylon, polysulfone, polytrifluorochloroethylene and polypropylene.

A fuel cell like that shown in FIGS. 1 and 2 was built and tested. The support plate 12 and the cover plate 34 were made from 3.2 mm thick acrylic sheet. The electrolyte layer 16 was made from a fine powder of Baymal alumina. This fine powder disperses readily in water to form a colloidal dispersion. In this example we made a dispersion. In this example we made a dispersion comprising 5%, by weight, Baymal alumina in water. Using a small brush a film of this dispersion was applied to the surface 14 and was immediately exposed to ammonia vapor which caused the film to gel. This gel was allowed to dry at room temperature resulting in a solid film having a typical thickness of about 3.0 micrometers.

The catalyst layers 22, 24 were applied to the electrolyte layer 16 in such a manner that a long edge of one layer was parallel to a long edge of the other layer with a gap 26 therebetween on only 0.3-0.4 millimeter. The anode catalyst layer 22 was prepared by dispersing 1.0 gm platinum supported on carbon (a conventional fuel cell catalyst) and 0.5 gm Baymal alumina in 9.5 gm water. The solids were allowed to settle out for several hours and the clear liquid was decanted. The remaining wet paste, which had a consistency of poster paint, was painted onto the electrolyte layer 16 as a rectangle about 2.0 cm long, 0.5 cm wide and 5 micrometers thick (after drying). The finished anode catalyst layer was an intimate mixture of supported platinum and Baymal alumina electrolyte.

The cathode catalyst layer was prepared by dispersing 0.45 g strontium ruthenate in 30 ml of a 5% (by weight) aqueous solution of Baymal alumina. The solids were allowed to settle out for several hours and the clear liquid was decanted. The remaining wet paste was painted onto the electrolyte layer 16 as a rectangle 2.0 cm long, 0.5 cm wide, and 5 micrometers thick (after drying). The finished cathode catalyst layer was an intimate mixture of strontium ruthenate and Baymal alumina electrolyte.

Figure 12:
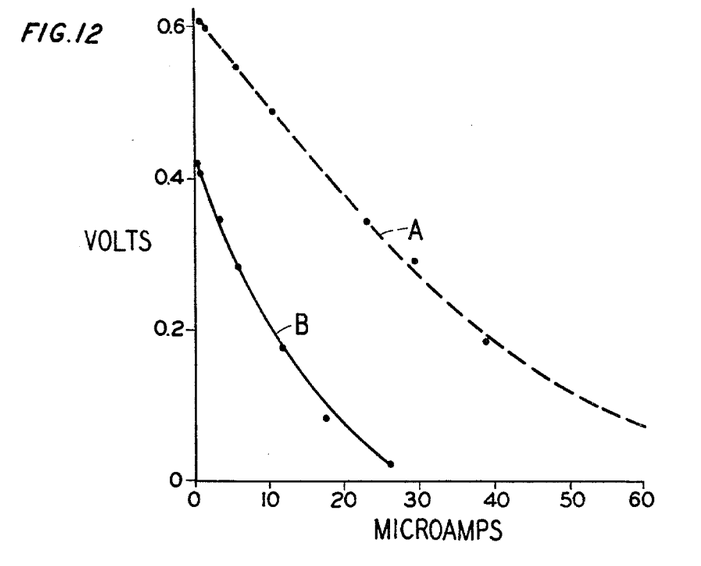
FIG. 12 is a graph showing performance curves for strontium ruthenate as an anode and then as a cathode catalyst, in each case the opposing electrode being a supported platinum catalyst.

Strontium ruthenate was chosen as the cathode catalyst because tests showed it to be selective to the reduction of oxygen. The selective catalytic performance of strontium ruthenate was determined by comparing it to the catalytic performance of a platinum catalyst layer in a cell of the type just described, except that the hydrogen and oxygen reactant gases over the catalyst layers were kept separate by suitable barrier means. First the strontium ruthenate was tested as a cathode by feeding 100% oxygen to it while feeding 100% hydrogen to the supported platinum catalyst layer. The curve A in the graph of FIG. 12 shows voltage versus current for varying resistive loads with strontium ruthenate as the cathode. The reactant flows were then reversed such that the strontium ruthenate was the anode. Curve B in FIG. 12 shows voltage versus current for varying resistive loads with strontium ruthenate as the anode. From the graph it can clearly be seen that strontium ruthenate has a significantly higher degree of catalytic activity as a cathode for the reduction of oxygen than it has as an anode for the oxidation of hydrogen.

The electrically conductive layer 28 was silver paint of the type generally used on printed circuit boards. It, too, was applied by hand using a small brush. The layer had a typical thickness of about 10 micrometers. It is estimated that the layer 28, including the fingers 30, covered about 10-15% of the surface area of each electrode. It is believed that this did not have a serious effect on cell performance. Note, however, that care must be taken not to cover too much of the catalyst surface area to assure that reactant gases have essentially complete access to catalyst areas.

To prevent reactant gas from leaking from the gas space 40 between the mating faces of the plates 12, 34, a thin layer of Fluorolube ® grease (a fluorocarbon-based product having the consistency of petroleum jelly and manufactured by Hooker Chemical Corp.) was applied to the mating surfaces surrounding the electrolyte layer 16. Clamps were used to hold the plates in gas sealing relationship during the tests hereinafter described.

The foregoing cell was run at room temperature on a reactant gas mixture comprising air and an equal amount (by volume) of 4% hydrogen in nitrogen. A diluted fuel gas was used to ensure the gas mixture could not ignite during the test. The reactant gas mixture was humidified to the extent of room temperature saturation prior to passing it through the cell by bubbling it through some water. It is believed that the surface ion conduction hereinbefore referred to takes the form of hydronium ion ($H_3O^+$) migration, and the water vapor enhances the ion current flow through the cell by combining with the hydrogen ions to form hydronium ions at the anode catalyst/electrolyte interface. The flow rate through the cell was maintained substantially constant at about 15 ml per minute. The results of the test, which continued for about 3 days, is displayed in Table 1 below. It took the cell about an hour to stabilize at an open circuit voltage of about 0.67 volts, and results prior to this time are not reflected in the table.

TABLE 1

| Resistance (10000 Ω) | Voltage (volts) | Current (microamps) |
|---|---|---|
| 1000. | 0.507 | 0.51 |
| 470. | 0.388 | 0.82 |
| 100. | 0.166 | 1.66 |
| 47. | 0.089 | 1.89 |
| 15. | 0.031 | 2.1 |
| 10. | 0.023 | 2.3 |
| 4.7 | 0.010 | 2.1 |
| 1.0 | 0.003 | 3.0 |

From Table 1 it is clear that a measurable amount of power was produced by the test cell despite the fact that only the cathode was a selective catalyst.

Figure 3:
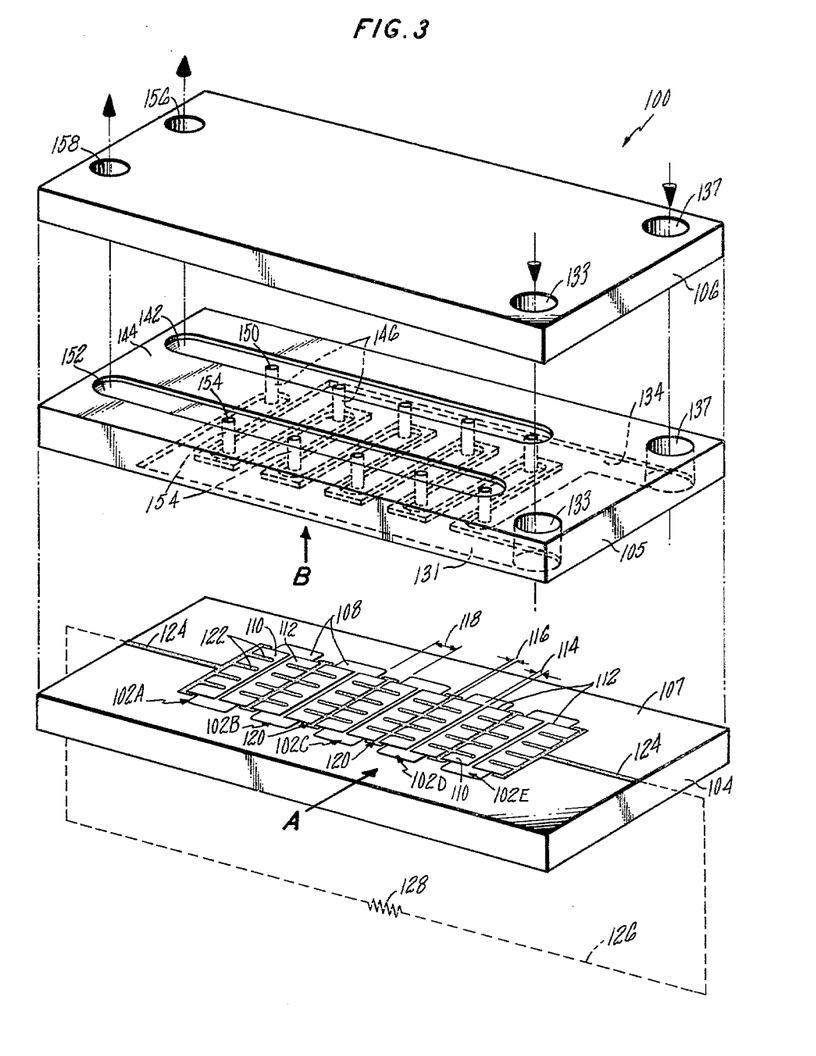
FIG. 3 is an exploded perspective view of a cell-group assembly in accordance with the present invention.
Figure 4:
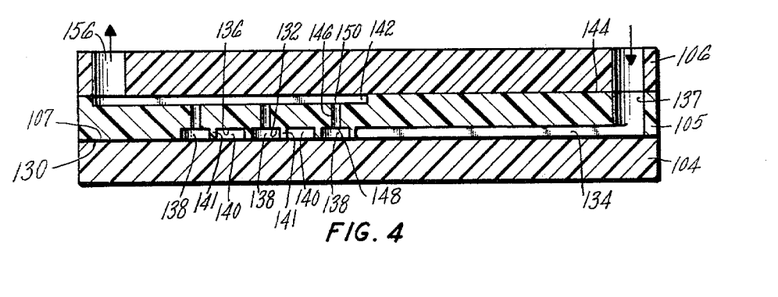
FIG. 4 is an offset cross-sectional view taken along the line 4—4 of FIG. 5.
Figure 5:
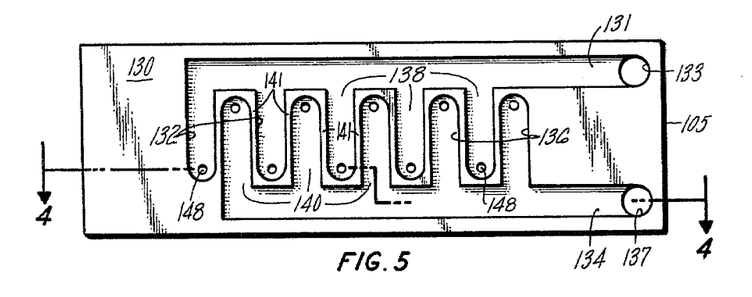
FIG. 5 is a bottom view of the manifold plate of FIG. 3 taken in the direction B of FIG. 3.

FIGS. 3 thru 5 show yet another embodiment of the present invention. The drawing depicts a cell-group assembly 99 comprising a cell stack component 100 and reactant manifold means 101. The cell stack component 100 comprises a "cell-group" of five cells labeled 102A thru 102E and a self-supporting substrate or support plate 104. A cell-group is a plurality of cells laterally disposed relative to each other and connected electrically in series. The manifold means 101 comprises a manifold plate 105 and a top plate 106. The five cells 102A thru 102E are disposed on the flat top surface 107 of the support plate 104. Each of the cells is similar in construction to the cell described with respect to FIGS. 1 and 2. Thus, referring to FIG. 3, each cell comprises an electrolyte layer 108, an anode catalyst layer 110, and a cathode catalyst layer 112. The catalyst layers within each cell are laterally spaced apart and in close proximity to each other on the surface of their respective electrolyte layers 108. A gap 114 separates the catalyst layers within a cell. Each cell 102A thru 102E is adjacent at least one other of the cells such that the cathode catalyst layer of one cell of each adjacent pair is in close proximity to but laterally spaced from the anode catalyst layer of the other cell of that pair. A space 116 (approximately the same width as the gap 114) is shown in the drawing as separating these catalyst layers. Gaps 118 separate the electrolyte layers 108 of adjacent cells to prevent ionic short circuits. The cells 102A thru 102E are connected electrically in series by bridging the spaces 116 with a layer 120 of electrically conductive material.

Figure 3A:
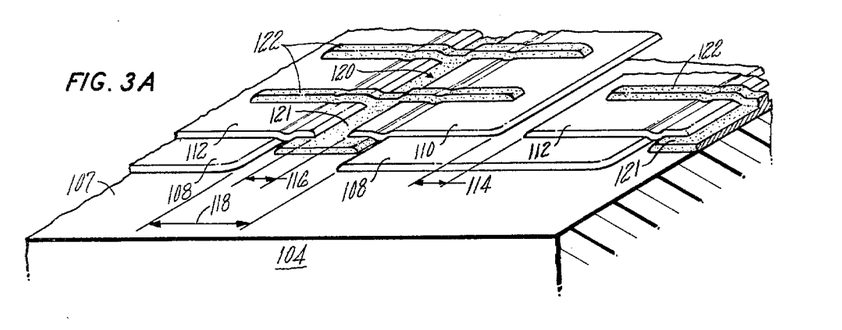
FIG. 3A is a perspective view taken in the direction A of FIG. 3 showing the cell elements with exaggerated thickness.

The spacial relationship between the various layers is best seen in FIG. 3A taken in the direction A of FIG. 3 wherein the thicknesses of the various cell layers are exaggerated for clarity. Note that each layer 120 includes a narrow stripe 121 of material under the adjacent catalyst edges and is somewhat wider than the gap between the catalyst edges. The stripes 121 are narrower than the gaps 118 such that the stripes 121 do not provide any electrical interconnection between adjacent electrolyte layers 108. A plurality of fingers 122 extend over the surfaces of the catalyst layers and interconnect with the stripes 121 along the gaps 116 for the purpose of providing improved electrical communication between the cells. The electrically conductive layers 120 of end cells 102A and 102E each include a narrow stripe 124 of electrically conductive material leading to an edge of the plate 104. These stripes 124 are interconnected by an external circuit 126 which includes a load 128.

Referring to FIGS. 4 and 5, machined into the bottom surface 130 of the manifold plate 105 is a fuel manifold channel 131 with a plurality of individual fuel channels 132 extending perpendicularly therefrom over each anode catalyst layer 110. A cylindrical fuel inlet passage 133 (FIG. 3 and FIG. 5) passes upwardly through both the plates 105 and 106 and communicates with the right-hand end of the fuel manifold channel 131. Also machined into the bottom surface 130 of the plate 105 is an oxidant manifold channel 134 with a plurality of individual oxidant channels 136 extending perpendicularly therefrom over each cathode catalyst layer 112. A cylindrical oxidant inlet passage 137 (FIG. 3 and FIG. 5) passes upwardly through both the plates 105 and 106 and communicates with the right-hand end of the oxidant manifold channel 134. The individual fuel channels 132 define separate fuel gas spaces 138 over each anode catalyst layer; and the individual oxidant channels 136 define separate oxidant gas spaces 140 over each cathode catalyst layer. Walls 141 in the plate 105 separate adjacent fuel and oxidant gas spaces and extend, alternately, along the gaps 114, 116 in sealing contact with the surfaces of the electrolyte layers 108 and the electrically conductive layers 120, respectively.

Associated with the individual fuel gas spaces 138, is a common fuel exhaust manifold channel 142 machined into the top surface 144 of the manifold plate 105. Cell fuel exhaust holes 146 drilled through the manifold plate 105 have their inlet ends 148 opening into their respective fuel gas spaces 138 and their outlet ends 150 opening into the exhaust manifold channel 142. Similarly, an oxidant exhaust manifold channel 152 (FIG. 3) in the top surface 144 of the manifold plate 105 communicates with the individual oxidant gas spaces 140 via cell oxidant exhaust holes 154 (FIG. 3) through the manifold plate 105. A cylindrical fuel outlet passage 156 and oxidant outlet passage 158 drilled through the top plate 106 communicate, respectively, with the left-hand end of the fuel exhaust manifold channel 142 and oxidant exhaust manifold channel 152. The three plates (shown in assembled relationship in the offset cross section of FIG. 4) are secured together by any suitable means such as bolts or clamps, not shown. As with the embodiment of FIGS. 1 and 2, a fluorocarbon base grease is applied to the mating surfaces of the plates to prevent gas leakage from the various manifolds and gas spaces formed between the plates.

A cell stack assembly comprising a five-cell cell-group like that shown in FIGS. 3 thru 5 was built and tested. Plates 104, 105, and 106 were made from acrylic sheet 3.2 mm thick. The electrolyte layers 108 were made from Baymal alumina, the same material as used in the single cell test described above and were applied in the same manner. In this example the electrolyte layer had an estimated thickness of about 3 micrometers. Its area was large enough to accommodate the greater part of both catalyst layers hereinafter described. The gap 118 between adjacent electrolyte layers was about 3.2 mm wide. After applying the electrolyte layers to the support plate a stripe 121 of electrically conductive silver paint 1.5–2.0 mm wide and about 10 micrometers thick was painted along the gaps 118 between the electrolyte layers but not touching the electrolyte layers so as not to provide an electrical interconnection therebetween.

Since the fuel and oxidant were kept separated, the same material was used for both the anode and cathode catalyst layers 110, 112. In this embodiment they were made from the same material (i.e., an intimate mixture of Baymal alumina and carbon supported platinum) as the anode catalyst layer in the single cell example hereinabove described. The catalyst layers were also prepared and applied by the same method as described for that previous example. In this cell-group each catalyst layer was a rectangle about 8 mm long and 5 mm wide. Its thickness was about 5 micrometers. The catalyst layers were applied to the electrolyte layers in such a manner that each long edge of each catalyst layer was parallel to a long edge of the adjacent catalyst layer, and one edge of each catalyst layer overlaid one of the metallic paint stripes 121 which had been applied along the gaps between electrolyte layers. Within each cell the gap 114 was about 0.4 millimeter. The space 116 between the catalyst layers of adjacent cells was also about 0.4 millimeter. The silver paint fingers 122 were then painted onto the surface of the catalyst layers, interconnecting with the silver paint stripes 121 exposed between the catalyst layers. It is estimated that the fingers 122, covered about 10% of the surface area of each catalyst layer.

In a test the foregoing cell stack component was run at room temperature using pure hydrogen as the fuel and pure oxygen as the oxidant, both humidified to the extent of room temperature saturation. The hydrogen was introduced into the cells via the fuel inlet passage 133 at a flow rate of about 14 ml per minute, and was distributed to the fuel gas spaces 138 over the anode catalyst layers 110 via the fuel manifold channel 131. Spent fuel left each cell via the exhaust holes 146 leading to the fuel exhaust manifold channel 142, and from that channel left the cell stack component via the fuel outlet passage 156. Similarly, the oxygen was introduced into the cell stack component at a flow rate of about 3 ml per minute via the oxidant inlet passage 137, whereupon it was distributed to the oxidant gas spaces 140 over the cathode catalyst layers 112. Spent oxidant left the cells via the oxidant exhaust holes 154, and exited the cell stack component via the oxidant outlet passage 158.

Figure 13:
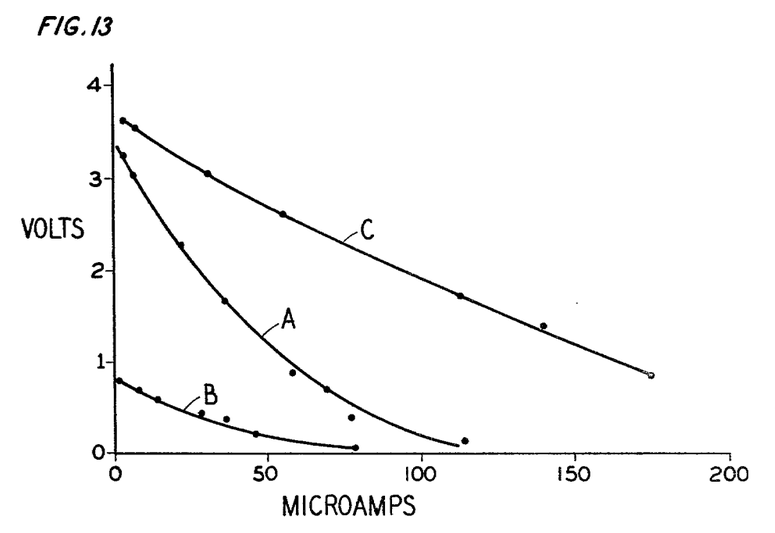
FIG. 13 is a graph showing performance curves for several different embodiments of the present invention.

The results of the test are shown in FIG. 13 as performance curve A.

A single cell of the same size and configuration as the cells of the five-cell cell-group was also tested under the same operating conditions. The results of that test are displayed in FIG. 13 as performance curve B. A comparison of curves A and B demonstrate the voltage additive effect of electrically connecting cells of the present invention in series.

Figure 6:
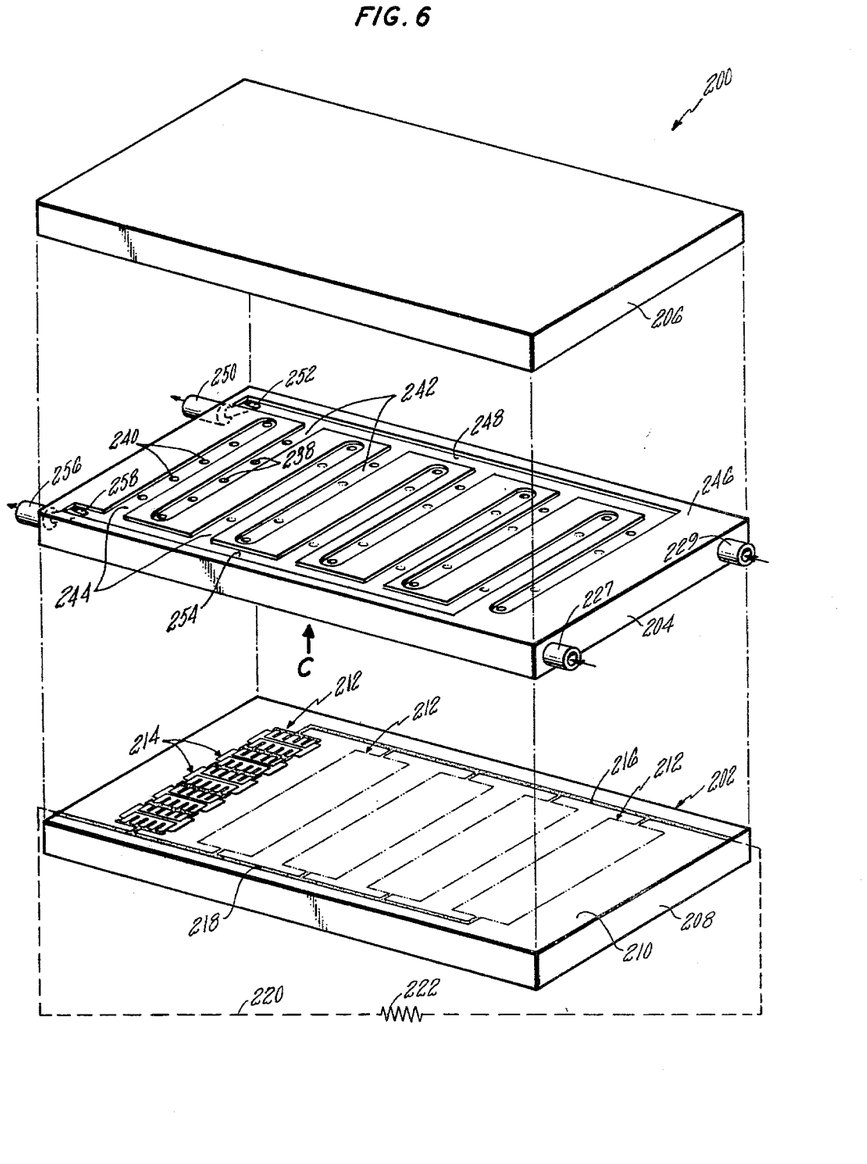
FIG. 6 is an exploded perspective view of a fuel cell stack assembly according to the present invention.
Figure 7:
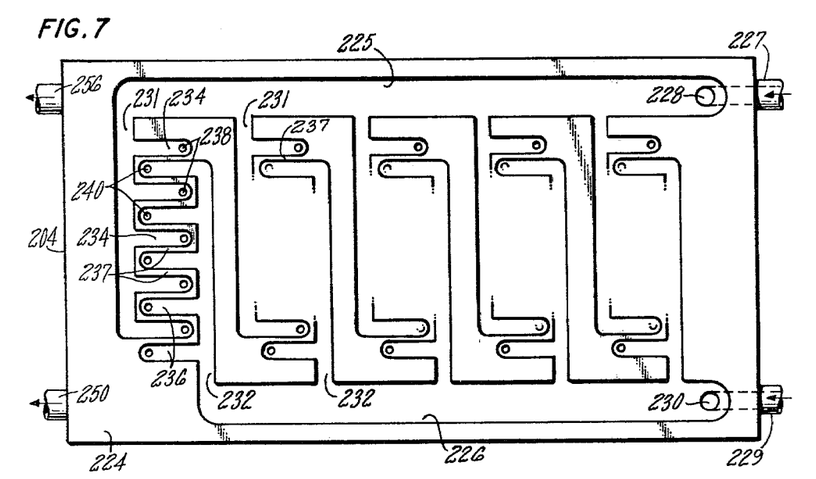
FIG. 7 is a bottom view of the manifold plate of FIG. 6 taken in the direction C of FIG. 6.

Turning now to FIGS. 6 and 7, a fuel cell stack 200 is shown. The stack 200 includes a cell stack component 202, a manifold plate 204, and a top plate 206. The cell stack component 202 comprises a support plate 208 having disposed on the top surface 210 thereof five cell-groups 212 each consisting of five cells 214. Each cell-group 212 is identical to the five-cell cell-group described with respect to FIGS. 3 thru 5. Reactant gas manifolding for feeding and removing reactant gases from each cell-group 212 is also very similar to that described with respect to the embodiment of FIGS. 3 thru 5. The cell-groups 212 are connected electrically in parallel by thin stripes 216, 218 of electrically conductive paint, and are connected to an external circuit 220 which includes a load 222.

Referring to FIG. 7 (which is a view taken in the direction C of FIG. 6), the bottom surface 224 of the manifold plate 204 includes a main fuel manifold channel 225 and a main oxidant manifold channel 226 machined therein. Fuel enters the stack 200 via a conduit 227 in communication with the main fuel manifold channel 225 via a passageway 228 through the manifold plate 204. Oxidant enters the stack 200 via a conduit 229 which is in communication with the main oxidant manifold channel 226 via a passageway 230 through the plate 204. The main fuel manifold channel 225 feeds fuel to a plurality of fuel header channels 231 which are functionally the same as the channel 131 of FIG. 5. The main oxidant manifold channel 226 feeds oxidant to oxidant header channels 232 which are functionally the same as the channel 134 of FIG. 5. Each header channel 231, 232 is associated with one of the cell-groups 212. Each fuel header channel 231 feeds fuel to individual fuel channels 234 which define separate fuel gas spaces over the anode catalyst layers of a cell-group 212. Similarly, oxidant header channels 232 feed oxidant to individual oxidant channels 236 which define separate oxidant gas spaces over the cathode catalyst layers of a cell-group. Walls 237 act as gas barriers or separators between the fuel and oxidant gas spaces. Spent reactant gases leave each cell via fuel exhaust holes 238 and oxidant exhaust holes 240 drilled through the manifold plate 204 and which lead, respectively, to fuel exhaust channels 242 and oxidant exhaust channels 244 machined into the top surface 246 of the manifold plate 204. The exhaust channels 242, 244 are functionally the same as the fuel exhaust manifold channel 142 and oxidant exhaust manifold channel 152, respectively, of the embodiment of FIGS. 3 thru 5. The fuel exhaust channels 242 empty into a fuel exhaust header channel 248 and leave the stack via a conduit 250 which is in communication with the header channel 248 via a passageway 252. The spent oxidant empties into an oxidant exhaust header channel 254 and leaves the stack via a conduit 256 which is in communication with the header channel 254 via a passageway 258.

A twenty-five cell stack virtually identical to that shown in FIGS. 6 and 7 was built and tested. Each cell-group and the individual cells therein were substantially identical in both materials, size, and method of construction as the sngle five-cell cell-group built and tested as described above. Test conditions, including reactant gas compositions and flow rates, were also the same as for the single five-cell cell-group test described above.

The results of that test are displayed in FIG. 13 as performance curve C. The amount of oxygen and hydrogen available to the cells using the same flow rates as indicated above for the single five-cell cell-group was determined to be well in excess of that required to generate the observed current. A comparison with curve A clearly shows the current additive effect of connecting cell-groups in parallel.

Although not shown, it is contemplated that a larger cell stack with greater power output could be made by stacking together, one atop the other, and electrically interconnecting several stacks 200.

Figures 8, 9:
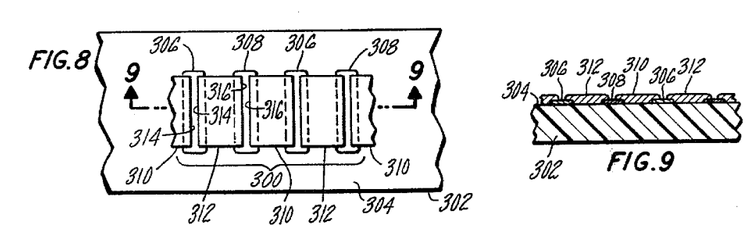
FIG. 8 is a top, partial view of a cell-group disposed on a support according to an alternate embodiment of the present invention.
FIG. 9 is a cross-sectional view taken along the line 9—9 of FIG. 8 with the thickness of the cell elements being exaggerated.

In the cells of all the foregoing examples the catalyst layers are disposed, in major part, on the surface of the electrolyte layer which, in turn, is disposed on the surface of a substrate or support plate. FIGS. 8 thru 11 show two other examples of cell-group configurations considered to be within the scope of the present invention. In FIGS. 8 and 9, part of a cell-group 300 is shown disposed on a nonconductive, inert support plate 302. The cell-group 300 is formed by applying narrow stripes or layers 306 of solid electrolyte to the surface 304 of the support plate, alternating with narrow stripes or layers 308 of electrically conductive material. Anode catalyst layers 310 and cathode catalyst layers 312 are then applied to the surface 304 of the support plate 302. Each catalyst layer is applied with one of its long edges 314 overlying a stripe 306 of electrolyte material, and its other long edge 316 overlying a stripe 308 of electrically conductive material. Note that the central portion or each catalyst layer is disposed directly on the surface 304.

Figure 10:
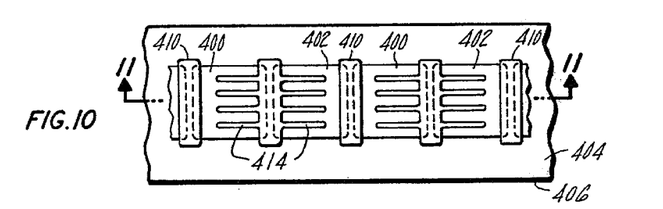
FIG. 10 is a top, partial view of a cell-group disposed on a support according to yet another embodiment of the present invention.
Figure 11:
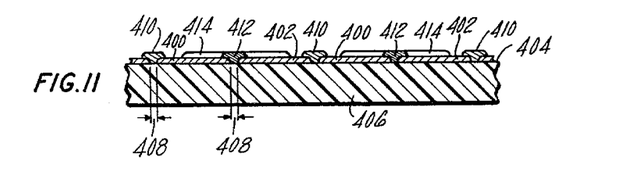
FIG. 11 is a cross-sectional view taken along the line 11—11 of FIG. 10 with the thickness of the cell elements being exaggerated.

In the embodiments of FIGS. 10 and 11, the anode and cathode catalyst layers 400, 402, respectively, are applied to the surface 404 of an inert support plate 406. Gaps 408 between adjacent catalyst layers are alternately bridged by stripes or thin layers of electrolyte material 410 and electrically conductive material 412. Fingers 414 of electrically conductive material extending outwardly from the electrically conductive stripes 412 are then applied to the surfaces of the catalyst layers to improve electrical conductivity.

The several embodiments shown in the drawing and described in the specification are only exemplary and should not be construed as limiting that which the inventors believe to be their invention. It should be understood by those skilled in the art that various changes and omissions in the form and detail of these embodiments may be made without departing from the spirit and the scope of the invention.

Having thus described typical embodiments of our invention, that which we claim as new and desire to secure by Letters Patent of the United States is:

1. A plurality of electrochemical cells for the production of electricity from a gaseous fuel and a gaseous oxidant, each cell comprising:
an anode electrode comprising a thin layer of anode catalyst adapted to electrochemically oxidize a gaseous fuel;
a cathode electrode comprising a thin layer of cathode catalyst adapted to electrochemically reduce a gaseous oxidant, said anode and cathode catalyst layers being laterally spaced apart and in close proximity to each other with a gap being defined between said layers;
means for feeding a gaseous fuel to said anode electrode and a gaseous oxidant to said cathode electrode and for removing spent fuel and oxidant from said cells; and
solid electrolyte means comprising electrolyte material bridging said gap between said anode and cathode catalyst layers to provide an ion conductive path therebetween, wherein said cells are laterally disposed relative to each other, each of said cells being adjacent at least one other of said cells, the cathode catalyst layer on one cell of each adjacent pair of cells being in close proximity to the anode catalyst layer of the other cell of said same adjacent pair of cells with a space being defined between said last mentioned anode and cathode catalyst layers, and electrically conductive material bridging said spaces and connecting said plurality of cells electrically in series to form a cell-group.

2. The electrochemical cells according to claim 1 wherein said electrolyte means is a thin layer of solid electrolyte.

3. The electrochemical cells according to claim 2 wherein each of said cells includes a substrate having a surface, and said thin layer of electrolyte is disposed on said surface, said anode catalyst layer and said cathode catalyst layer each being at least partly disposed on said layer of electrolyte.

4. The electrochemical cells according to claim 3 wherein said anode and cathode catalyst layers each comprise an intimate mixture of catalytic material and said electrolyte material.

5. The electrochemical cells according to claim 2 wherein said thin layer of solid electrolyte is less than 50 micrometers thick.

6. The electrochemical cells according to claim 5 wherein said catalyst layers are less than 50 micrometers thick.

7. The electrochemical cells according to claim 2 wherein said thin layer of solid electrolyte and said thin anode and cathode catalyst layers are all less than 10 micrometers thick.

8. The electrochemical cells according to claim 7 wherein the projected surface area of each of said anode and cathode catalyst layers is less than about 1.0 cm$^2$.

9. The electrochemical cells according to claim 7 wherein said means for feeding said gases to said electrodes includes means defining a common reactant gas space over said electrodes for the feeding of a gaseous mixture of the fuel and oxidant to said electrodes.

10. The electrochemical cells according to claim 9 wherein said anode electrode comprises means for selectively oxidizing the fuel of the gaseous mixture, and said cathode electrode comprises means for selectively reducing the oxidant of the gaseous mixture.

11. The electrochemical cells according to claim 9 wherein said anode catalyst layer is selective to the reduction of hydrogen and said cathode catalyst layer is selective to the reduction of oxygen.

12. The electrochemical cells according to claim 9 wherein at least one of said electrodes of each of said cells includes a selective gas diffusion film covering said catalyst layer of said electrode, said film being selective to the diffusion of hydrogen if covering said anode catalyst layer and selective to the diffusion of oxygen if covering said cathode catalyst layer.

13. The electrochemical cells according to claim 1 wherein said electrolyte means is a surface conducting solid electrolyte.

14. The electrochemical cells according to claim 1 wherein said means for feeding a gaseous fuel and a gaseous oxidant to said electrodes includes means defining a fuel gas space over said anode catalyst layers and means defining an oxidant gas space over said cathode catalyst layers, said fuel gas spaces being separate from said oxidant gas spaces, said means for feeding gases to said electrodes also including means for introducing an oxidant to said oxidant gas space and means for introducing a fuel to said fuel gas space.

15. A cell-group according to claims 1, 2, 3, 4, 8, 9, 10, 12, or 14 including self supporting substrate means having a surface, the cells of said cell-group being disposed on said surface, said substrate means and said cell-group defining a cell stack component.

16. A plurality of cell-groups according to claim 15 including means electrically connecting said cell-groups to form a network of parallel and series connected cell-groups defining a cell stack, wherein said means for feeding a gaseous fuel and a gaseous oxidant to said electrodes includes reactant manifold means for feeding the gases to said cells and for removing spent gases from said cells.

17. The cell stack according to claim 16 comprising a plurality of electrically interconnected cell stack components.

18. A method for producing electricity from an electrochemical cell comprising a thin anode catalyst layer, a thin cathode catalyst layer laterally spaced from said anode catalyst layer and in close proximity thereto with a gap being defined between said layers, and solid electrolyte means comprising electrolyte material bridging said gap to providean ion conductive path therebetween, including the steps of feeding a gaseous fuel to said anode catalyst layer and a gaseous oxidant to said cathode catalyst layer and removing spent fuel and oxidant from said cell;

electrochemically oxidizing said gaseous fuel at said anode catalyst layer and electrochemically reducing said gaseous oxidant at said cathode catalyst layer.

19. The method for producing electricity according to claim 18 wherein said gaseous fuel and gaseous oxidant are fed as a gaseous mixture to a common reactant gas space over said anode and cathode catalyst layers, and said step of oxidizing includes selectively oxidizing said gaseous fuel, and said step of reducing includes selectively reducing said gaseous oxidant.

20. The method for producing electricity according to claims 18 or 19 wherein said gaseous fuel is hydrogen and said gaseous oxidant is oxygen.

21. The method for producing electricity according to claims 18 or 19 wherein said solid electrolyte is in the form of a layer less than 10 micrometers thick and said layers of anode catalyst and cathode catalyst are each less than 10 micrometers thick.

* * * * *

UNITED STATES PATENT AND TRADEMARK OFFICE
CERTIFICATE OF CORRECTION

PATENT NO. : 4,248,941
DATED : February 3, 1981
INVENTOR(S) : GEORGE A. LOUIS ET AL It is certified that error appears in the above-identified patent and that said Letters Patent are hereby corrected as shown below:

Column 7, lines 60-61: Delete the sentence "In this example we made a dispersion."

Column 9, Table 1, first column: "Resistance (10000 $\Omega$)" should be --Resistance (1000 $\Omega$)--.

Column 12, line 58: "sngle" should be --single--.

Claim 1, Column 14, line 2: "on" should be --of--.

Claim 18, Column 16, line 1: "providean" should be --provide an--.

Signed and Sealed this

Seventh Day of July 1981

[SEAL]

Attest:

RENE D. TEGTMEYER

Attesting Officer   Acting Commissioner of Patents and Trademarks